United States Patent Office 2,871,158
Patented Jan. 27, 1959

2,871,158

LAXATIVE SYRUPS CONTAINING DI-n-OCTYL SULFOSUCCINATE SALTS

Paul S. Cardaciotto, Trenton, N. J., and Emil A. Vitalis, Springdale, Conn., assignors to American Cyanamid Company, New York, N. Y., a corporation of Maine No Drawing. Application July 1, 1957
Serial No. 668,848

6 Claims. (Cl. 167—56)

This invention relates to laxative compositions in the form of aqueous medicated syrups suitable for oral administration and containing, as an effective feces softening agent, an alkali metal, ammonium or an ethanolamine salt of di-(normal octyl) sulfosuccinic acid or a mixture thereof. The invention includes syrups of this character containing the sulfosuccinate salt or a mixture of two or more sulfosuccinate salts as essential laxative or feces softening ingredient together with conventional or suitable quantities of an aqueous sugar solution which may also contain other ingredients such as preservatives, flavoring materials, coloring materials and organic solvents.

Within recent years it has been shown that sodium di-(2-ethylhexyl) sulfosuccinate, which is sold commercially as "Aerosol OT," is an effective agent for relieving constipation of the lower intestinal tract. It acts to relieve congestion by softening the feces but has no spasmodic action on the intestines and is not adsorbed thereby into the body. Our present invention is based on the discovery that the alkali metal, ammonium and ethanolamine salts of di-(normal octyl) sulfosuccinic acid are also effective feces softening agents and therefore have the same laxative properties as "Aerosol OT" but possess certain practical advantages thereover which permit their use in medicated syrups.

The most important advantage of the alkali metal, ammonium and ethanolamine salts of di-(normal octyl) sulfosuccinic acid over the corresponding salts of di-(2-ethylhexyl) ester is the difference in taste. The water-soluble salts of di-(2-ethylhexyl) sulfosuccinic acid are extremely bitter; furthermore, their bitter taste remains in the mouth for up to 30 minutes after oral ingestion. For this reason it is very difficult or impossible to mask this taste in syrups and other preparations for oral administration by the use of flavoring materials since soluble flavors usually disappear promptly from the taste organs and leave the residual bitter taste of the sulfosuccinate. The corresponding salts of di-(normal octyl) sulfosuccinic acid, on the other hand, have no pronounced or lasting bitter taste when purified from residual inorganic salts and organic impurities.

In addiiton, the alkali metal, ammonium and monoethanolamine salts of the diester of sulfosuccinic acid with normal octyl alcohol (octanol-1) can be prepared in the form of dry powders that can easily be weighed out in small amounts and dissolved in suitable liquids for incorporation into aqueous syrups.

While our invention is not limited to any theoretical explanation, we believe that the above differences in the essential physical and taste characteristics of the two classes of compounds can be explained on the basis of isomerization. Both sulfosuccinic acid and 2-ethylhexanol contain an asymmetric carbon atom, and therefore the bis-ester of the sulfosuccinic acid with the alcohol can exist as a mixture of a large number of optical isomers. On the other hand, normal octyl alcohol contains no asymmetric carbon atom and therefore forms relatively homogeneous sulfosuccinate bis-ester salts. Regardless of explanation, however, we have established the fact that the water-soluble salts of di-(normal octyl) sulfosuccinic acid are relatively tasteless, can be dissolved in pharmaceutical syrups in concentrations suitable for administration in ordinary teaspoon or tablespoon dosages, and possess excellent feces softening properties when so administered to human or animal patients.

In preparing the compounds used in practicing the invention 2 moles of normal octyl alcohol are esterified with 1 mole of maleic anhydride to form the bis-ester. The esterification is preferably carried out with a 5–10% excess of alcohol over the theoretical amount and in the presence of a small amount of para-toluene sulfonic acid as catalyst. Typical preparation procedures are described in U. S. Patent No. 2,028,091.

The bis-ester is preferably purified by vacuum distillation at pressures of about 0.5–1 mm. of mercury and is then sulfonated by refluxing with an alkali metal, ammonium or ethanolamine bisulfite in aqueous ethanol. This yields a technical grade of product which ordinarily has a purity of better than 99%, but which contains small amounts of inorganic salts, unreacted octanol, hydrocarbons, ethers and unsulfonated ester. A chemically pure product is therefore preferably obtained by dissolving the technical grade material in methanol and filtering and washing. The following procedure, used for the purification of sodium di-n-octyl sulfosuccinate, is representative.

A 400 gram portion of sodium di-n-octyl sulfosuccinate is dissolved in 800 ml. of anhydrous methanol and filtered through washed (aqueous methanol) diatomaceous earth filter aid. The filter cake is washed with 75 ml. of dry methanol. At least 5 moles (82.5 ml.) of water for each mole of sulfosuccinate is added to the filtrate which is then allowed to stand at 8°–12° C. for 1–2 hours. To this is added, with stirring, 200 ml. of methanol containing 25 ml. of water, all at 5° C. The mixture is centrifuged in a cloth lined basket cooled to 10°–15° C. and the collected solids are vacuum dried at room temperature.

The purified product so obtained is chilled to a temperature well below 0° C., preferably by storing in a Dry Ice (solid carbon dioxide) compartment and is then mixed with Dry Ice and ground to a fine powder in a motor-driven blade-type grinder. The quantity of Dry Ice added is such as to offset the heat of grinding; in preparing small batches it is about one-third to one-half the weight of the sodium di-(n-octyl) sulfosuccinate whereas a considerably smaller proportion can be used in large scale batches since the weight proportion of the chilled sulfosuccinate to that of the grinder is larger. Alkali metal, ammonium and monoethanolamine salts of di-(n-octyl) sulfosuccinic acid prepared and ground by this procedure are dry, free-flowing powders that can be weighed or measured accurately and incorporated into the syrups of the invention by direct addition or by first dissolving in water or aqueous ethanol.

The proportions or concentrations of di-n-octyl sulfosuccinate salt or salt mixture in the syrups of the invention may be varied between relatively wide limits and will depend largely on the dosage desired. For humans the optimum dose is from about 5 to 25 mg. of the sulfosuccinate for babies and children and from about 50 to 100 mg. for adults; for animals it is roughly about 1 mg. for each 3 to 4 lbs. of the animal's weight. In the laxative syrups of the invention the optimum concentration of sulfosuccinate salt should therefore be from about 0.1% to about 1%, or about 1 to 10 grams per liter in preparations for humans; higher concentrations up to 2–4% may be desirable in veterinary preparations, and may be used.

Syrups containing up to 2 grams per liter of any one of the alkali metal, ammonium or ethanolamine salts of di-n-octyl sulfosuccinic acid can be prepared by simple admixture of the ingredients, since no difficulty is experienced in maintaining these quantities of the sulfosuccinate salt in solution in the syrups. For higher concentrations it is advisable either to include an organic solvent or a solubilizing agent in the syrup or both, or to employ a mixture of two or more different sulfosuccinate salts. Suitable solvents are ethanol and polyhydric alcohols such as propylene glycol and glycerol which may advantageously be included in the syrups in quantities up to 10–15%. Suitable solubilizing agents are typified by urea and other similar hydrotropic materials which increase the solubility of the water-soluble sulfosuccinates in water.

We have found, however, that higher concentrations of active di-n-octyl sulfosuccinate can be obtained in the syrups of our invention by employing two or more different salts in admixture. By adding equal quantities of both sodium di-n-octyl sulfosuccinate and triethanolamine di-n-octyl sulfoccinate, for example, we can obtain concentrations up to 4–5 grams per liter of total sulfosuccinate in the syrups, and still higher concentrations can be obtained by including a third salt such as the ammonium salt. Dry powdered mixtures of two or more different water-soluble sulfosuccinates taken from the group consisting of the alkali metal, ammonium and monoethanolamine di-n-octyl sulfosuccinates, which can easily be weighed or measured accurately and incorporated into syrups by simple dissolution, therefore constitute an important commercial product to be used by pharmaceutical manufacturers or druggists in preparing laxative syrups in accordance with our invention. It will be understood that the solubilizing agents described above will also assist in maintaining these mixtures in solution, and may therefore be added to the syrups containing them.

The effectiveness of this procedure is illustrated by the following solubility characteristics of the sodium and triethanolamine salts of di-(normal octyl) sulfosuccinic acid in water. When 1% aqueous solutions of these salts are prepared in hot water and cooled slowly the sodium salt begins to crystallize at 25° C. while the solution of the triethanolamine salt, which is considerably more soluble, remains clear at temperatures slightly below 5° C. A 2% aqueous solution of the sodium salt begins to crystallize from solution at 40° C. while a 2% solution of the triethanolamine salt will remain clear at temperatures below 5° C. When 1% of the sodium salt and 1% of the triethanolamine salt are dissolved together in hot water and the solution is cooled, crystallization begins at 20° C.

More highly concentrated aqueous solutions of the alkali metal, ammonium and ethanolamine salts of di-n-octyl sulfosuccinic acid can be prepared by adding urea in quantities of about 1–15%. For example a 2% aqueous solution of the sodium salt containing 5% of urea, based on the weight of the water, remains clear at 21° C.; in a 10% solution of urea in water its solubility at 21° C. is 2.7%. Concentrations of more than about 15% of urea are not ordinarily employed in syrups to be administered to humans; however, considerably higher concentrations up to 30–40% of urea can be incorporated into veterinary syrups and have a still more powerful solubilizing action on the sulfosuccinate salts. Thus, a 9% aqueous solution of sodium di-n-octyl sulfosuccinate containing 30% of urea is stable at 20° C. and a 16% solution of the same salt containing 40% of urea is stable at the same temperature. It is improbable that such highly concentrated solutions would ever be administered as laxatives, even to animals, but the figures illustrate the greatly increased solubilities that can be obtained by including urea or other similar hydrotropic material in the syrups of the invention.

A medicated pharmaceutical syrup is, of course, an aqueous sugar solution having a medicament dissolved therein. The sugar is almost always sucrose, but it will be evident that other sugars such as corn sugar could be used if desired. The concentration of sugar depends on the desired viscosity, and may therefore be varied between wide practical limits; a minimum concentration of about 10–20% and a maximum of about 80% represents accepted practice. Preservatives such as sodium benzoate or esters of para-aminobenzoic acid are usually incorporated to hold down mold growth, and their quantity is usually increased in more dilute sugar solutions. Sweetening agents such as saccharin, sodium sucryl and the like may be incorporated as well as flavoring materials such as peppermint, fruit flavors and the like.

The syrups may be colorless or may be colored by the incorporation of suitable dyes, preferably Food, Drug and Cosmetic Approved dyes. When such dyes are incorporated into the syrups of the invention which also contain urea it may be advisable to add a small amount, on the order of 0.5–2%, of ascorbic acid or other suitable fading inhibitor to preserve the intensity of the color.

In preparing the syrups of the invention the alkali metal, ammonium or the mono-, di- or triethanolamine salt or di-(normal octyl) sulfosuccinic acid may be incorporated by any suitable procedure. The sulfosuccinate salts may be first dissolved in a water-soluble organic solvent such as ethanol, propylene glycol and the like, if these solvents are to be incorporated into the syrups, and the resulting solutions added to the water used. If the sulfosuccinate salts are originally supplied in solid form they are preferably dissolved in the water after it has been heated to 60°–100° C. Difficulty soluble preservatives such as methyl or propyl para-aminobenzoates may also be dissolved in the hot water. Oil-base flavors such as oil of peppermint leaves, orange flavor and the like are also preferably added as solutions in one or more of the water-soluble organic solvents. Solubilizers such as ethylene oxide condensation products of polyhydric alcohol monoesters of higher fatty acids may be added directly to the aqueous solutions or they may be first dissolved in the organic solvent. A representative procedure for incorporating the various types of ingredients into the syrups is described in detail in the following example.

A tank provided with an agitator and with cooling coils is charged with the requisite quantity of water heated to 85° C. and the sulfosuccinate or the sulfosuccinate mixture and the preservatives are added and dissolved. The passage of cooling water through the coils is then begun. While the batch is cooling to room temperature the sugar (preferably sucrose) and any suitable sweetening agents such as sodium saccharin and sodium sucryl may be added. Sorbitol or other viscosity increasing agents may be added when room temperature has been reached and also urea or other hydrotropic agents for increasing the solubility of the sulfosuccinate. In the preparation of colored syrups containing urea it is advisable to add about 0.5–2% by weight of ascorbic acid to prevent bleaching or fading of the dye.

Flavors such as oil of peppermint, orange, cherry and the like are preferably dissolved separately in any water-soluble solvents that may be used such as ethanol, propylene glycol, glycerine and the like. Solubilizers such as polyoxyethylene sorbitan monolaurate, monopalmitate, monostearate or monooleate (Tween 20, 40, 60 or 80) may be added to these solutions if desired, or they may be added to the main batch along with the sweeteners. In either case the flavor solution is then added to the batch in the mixing tank. Colors (Drug and Cosmetic, or Food, Drug and Cosmetic Approved) are then added and the syrup is brought to its final volume by the addition of water if necessary. It may then be filtered if desired to remove any suspended impurities.

Syrups were prepared by this procedure having the compositions indicated below. Preparation No. 1 is a harmless and efficient feces softening agent for human adults when administered in dosages of from 1 to 2 teaspoonfuls per day; it is also efficient when administered to animals in comparable quantities.

|  | No. 1 Percent | No. 2 | |
|---|---|---|---|
|  |  | Percent | Amount |
| Water | 40.0 | 50.0 | 500 cc. |
| Sodium di-n-octyl sulfosuccinate | 0.4 | 0.2 | 2 g. |
| Methyl parabens (p-aminobenzoate) | 0.1 | 0.1 | 1 g. |
| Propyl parabens (p-aminobenzoate) | 0.02 | 0.02 | 0.2 g. |
| Sorbitol (70% Soln.) | 5.0 | 5.0 | 50 g. |
| Sodium saccharin | 0.04 | 0.04 | 0.4 g. |
| Sodium sucryl (cyclamate sodium) | 0.4 | 0.4 | 4 g. |
| Sucrose | 60.0 | 60.0 | 600 g. |
| Sorbitan monolaurate | None | 0.7 | 7 cc. |
| Propylene glycol | None | 1.45 | 14.5 cc. |
| Ethanol | 10.0 | None |  |
| Urea | 10.0 | None |  |
| Ascorbic acid | 2.0 | None |  |
| Oil of peppermint leaves | 0.05 | 0.05 | 0.5 cc. |
| Orange (terpeneless) | 1.0 | None |  |
| Cherry Flavor | None | 0.1 | 1 cc. |
| F. D. C. Green No. 2, 0.5% Soln. | 0.15 | None |  |
| F. D. C. Yellow No. 1, 0.5% Soln. | 0.20 | None |  |
| Drug & Cosmetic Red No. 33 | None | 0.0015 | 10 cc. |
| Water, q. s. to 1 liter | None | ---- | 43 cc. |

What we claim is:

1. A laxative syrup comprising an aqueous sugar solution having dissolved therein, as a feces softening agent, from about 0.1% to 4% of a di-(normal octyl) sulfosuccinate salt selected from the group consisting of alkali metal, ammonium and ethanolamine salts and mixtures thereof.

2. A laxative syrup comprising an aqueous sugar solution having dissolved therein, as a feces softening agent, a di-(normal octyl) sulfosuccinate salt selected from the group consisting of alkali metal, ammonium and ethanolamine salts and mixtures thereof in an amount of from 0.2% to 4% and also containing about 1% to 15% of a solubilizing agent for said sulfosuccinate salt selected from the group consisting of ethanol, propylene glycol, glycerol and urea.

3. A laxative syrup comprising an aqueous sugar solution having dissolved therein, as a feces softening agent, from about 0.2% to 4% of a mixture of at least two different di-(normal octyl) sulfosuccinate salts each selected from the group consisting of alkali metal, ammonium and ethanolamine salts.

4. A laxative syrup comprising an aqueous sugar solution having dissolved therein, as a feces softening agent, from about 0.1% to 4% of sodium di-(normal octyl) sulfosuccinate.

5. A laxative syrup comprising an aqueous sugar solution having dissolved therein, as a feces softening agent, from about 0.2% to 4% of sodium di-(normal octyl) sulfosuccinate together with a quantity of a solubilizing agent sufficient to keep said sodium sulfosuccinate in solution in said syrup at 20° C., said solubilizing agent being selected from the group consisting of ethanol, propylene glycol, glycerol and urea.

6. A laxative syrup comprising an aqueous sugar solution having dissolved therein as a feces softening agent, from about 0.2% to 4% of a di-(normal octyl) sulfosuccinate salt selected from the group consisting of alkali metal, ammonium and ethanolamine salts together with a pharmaceutically approvid dye, a quantity of urea within the range of about 1–15% and sufficient to keep said sulfosuccinate salt in solution in said syrup at 20° C., and about 0.5–2% of ascorbic acid to prevent fading of said dye by the urea.

References Cited in the file of this patent

Wilson: J. A. M. A., vol. 158, No. 4, May 28, 1955, pp. 261–263.

Van Hook: Chem. Abst., No. 46, 1952, pp. 3778 (i) and 3779(a).